US010396867B2

(12) United States Patent
Kundargi et al.

(10) Patent No.: US 10,396,867 B2
(45) Date of Patent: Aug. 27, 2019

(54) REDUCED-COMPLEXITY DOWNLINK (DL) SIGNAL DEMODULATION USING RECIPROCITY REFERENCE SIGNALS FOR MIMO WIRELESS COMMUNICATION SYSTEMS

(71) Applicant: NATIONAL INSTRUMENTS CORPORATION, Austin, TX (US)

(72) Inventors: Nikhil U. Kundargi, Austin, TX (US); Karl F. Nieman, Austin, TX (US)

(73) Assignee: National Instruments Corporation, Austin, TX (US)

( * ) Notice: Subject to any disclaimer, the term of this patent is extended or adjusted under 35 U.S.C. 154(b) by 30 days.

(21) Appl. No.: 15/796,902

(22) Filed: Oct. 30, 2017

(65) Prior Publication Data

US 2018/0123657 A1    May 3, 2018

Related U.S. Application Data

(60) Provisional application No. 62/417,057, filed on Nov. 3, 2016.

(51) Int. Cl.
*H04B 7/0452* (2017.01)
*H04L 5/00* (2006.01)
(Continued)

(52) U.S. Cl.
CPC .......... *H04B 7/0452* (2013.01); *H04B 7/0626* (2013.01); *H04L 5/0048* (2013.01);
(Continued)

(58) Field of Classification Search
CPC ... H04B 7/0452; H04B 7/0626; H04L 5/0048; H04L 27/34; H04W 72/042; H04W 72/0446; H04W 88/02; H04W 88/08
See application file for complete search history.

(56) References Cited

U.S. PATENT DOCUMENTS 6,173,191 B1 * 1/2001 Jennings, III .......... H01Q 1/246
    455/277.1
8,325,755 B2  12/2012 Lee et al.
(Continued)

OTHER PUBLICATIONS

Vieira et al., "*Reciprocity Calibration Methods for Massive MIMO Based on Antenna Coupling*", Department of Electrical Engineering, Lund University, Jan. 1, 2014, pp. 1-6.
(Continued)

*Primary Examiner* — Dinh Nguyen
(74) *Attorney, Agent, or Firm* — E. Alan Davis; James W. Huffman (57) ABSTRACT

A method for reducing complexity of downlink signal demodulation in a multiuser (MU) multiple-input-multiple-output (MIMO) wireless communication system includes a base station acquiring uplink (UL) channel state information (CSI) of a MIMO channel between the base station and a user equipment (UE), deriving downlink (DL) CSI from the UL CSI, and transmitting orthogonal frequency-division multiplexing (OFDM) radio subframes using MIMO pre-equalization based on the DL CSI. The UE performs downlink reciprocity correction of the OFDM subframes received from the base station using a single complex phasor estimate and performs downlink data demodulation of the downlink reciprocity corrected OFDM subframes without performing additional MIMO equalization.

20 Claims, 6 Drawing Sheets

(51) Int. Cl.
   *H04W 72/04*   (2009.01)
   *H04B 7/06*    (2006.01)
   *H04L 27/34*   (2006.01)
   *H04W 88/08*   (2009.01)
   *H04W 88/02*   (2009.01)

(52) U.S. Cl.
   CPC .......... *H04L 27/34* (2013.01); *H04W 72/042* (2013.01); *H04W 72/0446* (2013.01); *H04W 88/02* (2013.01); *H04W 88/08* (2013.01)

(56) References Cited

U.S. PATENT DOCUMENTS

| | | | |
|---|---|---|---|
| 9,191,161 B2 | 11/2015 | Li et al. | |
| 2002/0045433 A1* | 4/2002 | Vihriala | H03J 7/00 455/313 |
| 2004/0048619 A1* | 3/2004 | Kim | H04W 52/16 455/452.1 |
| 2004/0091057 A1* | 5/2004 | Yoshida | H04L 25/03146 375/260 |
| 2005/0185733 A1* | 8/2005 | Tolli | H04L 1/0025 375/285 |
| 2007/0201536 A1* | 8/2007 | Nicolas | H04B 7/022 375/141 |
| 2015/0085692 A1* | 3/2015 | Wang | H04L 5/0048 370/252 |
| 2015/0172019 A1* | 6/2015 | Tang | H04B 7/06 370/203 |
| 2015/0326286 A1 | 11/2015 | Wong et al. | |
| 2015/0326291 A1* | 11/2015 | Wong | H04L 7/0012 375/267 |
| 2015/0326383 A1 | 11/2015 | Wong et al. | |
| 2016/0036546 A1* | 2/2016 | Campos | H03M 13/353 370/336 |
| 2017/0290013 A1 | 10/2017 | McCoy et al. | |
| 2018/0206129 A1* | 7/2018 | Choi | H04L 1/00 |

OTHER PUBLICATIONS

Harris et al., "University of Bristol and Lund University Partner with NI to Set World Records in 5G Wireless Spectral Efficiency Using Massive MIMO", dowloaded from www.ni.com, May 2016, pp. 1-7.
"LTE in a Nutshell—Physical Layer", Telesystem Innovations Inc. White Paper, 2010, pp. 1-10.
"An Introduction to Orthogonal Frequency Division Multiplex Technology", Keithley Instruments, Inc., 2008, pp. 1-66.
Huawei, "WF on CSI Acquisition in NR", 3GPP TSG RAB WG1 Meeting #85, May 23-27, 2016, pp. 1-4.
Huawei et al., "WF on CSI Acquisition Framework in NR", 3GPP TSG RAN WG1 Meeting #85, May 23-27, 2016, pp. 1-3.
"Study on Latency Reduction Techniques for LTE", 3GPP TR 36.881 Vo.6.0 Technical Report, Feb. 2016, pp. 1-92.
"Study on Scenarios and Requirements for Next Generation Access Technologies", 3GPP TR 38.913 Vo.2.0, Feb. 2016, pp. 1-19.
Vieira et al., "A Flexible 100-Antenna Testbed for Massive MIMO", Department of Electrical Information Technology at Lund University, Jan. 1, 2014, pp. 1-7.
"Bristol and Lund Set a New World Record in 5G Wireless Spectrum Efficiency" Bristol Univeristy, News, March: Massive MIMO demonstration, Mar. 23, 2016, pp. 1-6.
"Study on NR New Radio Access Technology", 3GPP TSG RAN Meeting #71, Goteborg, Sweden, Mar. 7-10, 2016, pp. 1-8.
"LTE Small Cell Enhancement by Dual Connectivity", Wireless World Research Forum, Outlook Visions and Research Directions for the Wireless World, Whitepaper, Nov. 2014, pp. 1-22.
"LTE in a Nutshell: Protocol Architecture" Telesystem Innovations Inc. White Paper, 2010, pp. 1-12.
"LTE Random Access Procedure" http://www.eventhelix.com/eventstudio/, Jul. 28, 2017, pp. 1-5.
Luther, "5G Massive MIMO Testbed: From Theory to Reality", National Instruments, Jun. 8, 2016, pp. 1-11.
"Introduction to the NI mmWave Transceiver System Hardware", National Instruments, Apr. 20, 2016, pp. 1-8.
"National Instruments Wireless Research Handbook", National Instruments, May 2016, pp. 1-37.
Shepard et al. "Argos: Practical Many-Antenna Base Stations" MobiCom 12, Aug. 22-26, 2012, Istanbul, Turkey, pp. 53-64.
Khoolenjani, et al. "Distribution of the Ratio of Normal and Rice Random Variables" Digital Commons @WayneState, *Journal of Modern Applied Statistical Methods*, vol. 12, Issue 2, Article 27, Nov. 1, 2013, pp. 1-15.
Shen et al. "*Channel Estimation in OFDM Systems*", Freescale Semiconductor, Inc. Application Note, Jan. 2006, pp. 1-16.

* cited by examiner

Antenna port 7

Antenna port 8

Antenna port 9

Antenna port 10

REDUCED-COMPLEXITY DOWNLINK (DL) SIGNAL DEMODULATION USING RECIPROCITY REFERENCE SIGNALS FOR MIMO WIRELESS COMMUNICATION SYSTEMS

This application claims the benefit of U.S. Provisional Application No. 62/417,057, filed on Nov. 3, 2016 which is hereby incorporated by reference in its entirety as though fully and completely set forth herein.

BACKGROUND

Technical Field

The disclosed embodiments relate to mobile telecommunications.

The New Radio (NR) definition in 3GPP (3$^{rd}$ Generation Partnership Project) for mobile systems will encompass a variety of deployment scenarios envisioned for 5G (fifth generation) mobile communication systems. MIMO (multiple input, multiple output) communication systems can be used for 5G TDD (time division duplex) air interfaces. In particular, massive MIMO reciprocity-based TDD air interfaces allow for symbol-level switching and potential configurability that in turn allow for features to support various aspects of 5G air interfaces, for example, enhanced Mobile BroadBand (eMBB), massive Machine Type Communications (mMTC) and Ultra-Reliable and Low Latency Communications (URLLC). Example embodiments for massive MIMO communication systems and related reciprocity-based TDD air interfaces are described within U.S. Published Patent Application 2015/0326286, entitled "MASSIVE MIMO ARCHITECTURE," U.S. Published Patent Application 2015/0326383, entitled "SYNCHRONIZATION OF LARGE ANTENNA COUNT SYSTEMS," and U.S. Published Patent Application 2015/0326291, entitled "SIGNALING AND FRAME STRUCTURE FOR MASSIVE MIMO CELLULAR TELECOMMUNICATION SYSTEMS," each of which is hereby incorporated by reference in its entirety.

Beamforming in massive MIMO communication systems is based upon the time reversal property of electromagnetic waves. The wireless channels used for such MIMO communications are typically reciprocal in the UL (uplink) direction and the DL (downlink) direction. One use of this reciprocity is to reuse the UL channel estimate for DL precoding to gain a significant reduction in channel estimation overhead as compared to an alternative option of sending DL pilots from each DL antenna port and receiving the CSI/PMI (channel state information/precoding matrix index) feedback on the UL channel. This use of reciprocity is an attractive feature for large antenna count MIMO scenarios supporting a large number of UEs.

Figure 1:
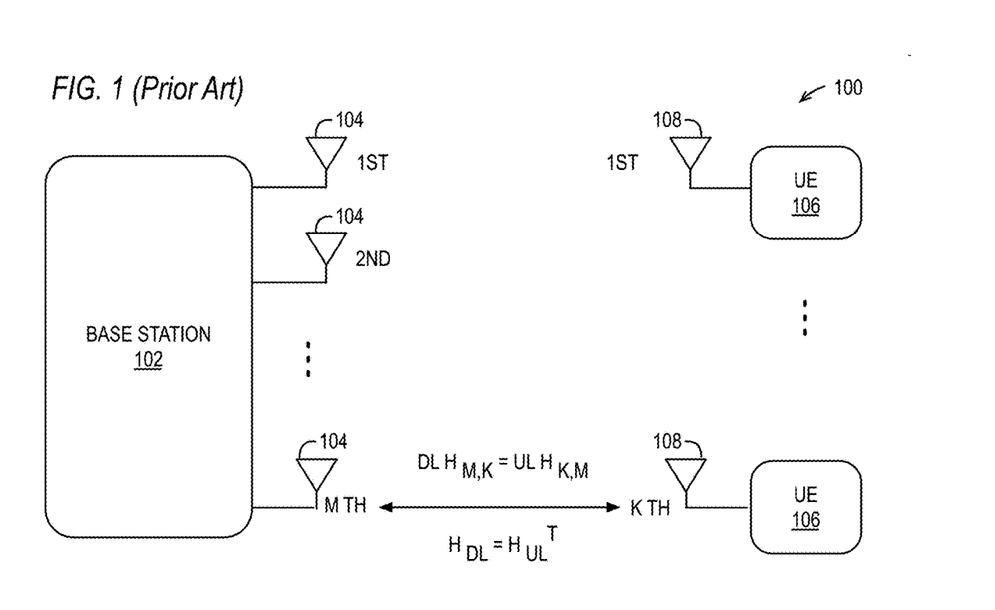
FIG. 1 (Prior Art) is a diagram of an example embodiment for channel reciprocity associated with a base station with M antennas that provides a wireless MIMO communication system.

FIG. 1 (Prior Art) is a diagram of an example embodiment for channel reciprocity associated with a base station 102 with M antennas 104 that provides a wireless MIMO communication system 100. The MIMO base station 102 communicates through its M antennas 104 with K different user equipment (UE) devices 106, such as mobile handsets, that each also have an antenna 108. Based on electromagnetic properties, ideal channel reciprocity for a wireless communication channel between one of the base station antennas 104 and one of the UE antennas 108 will provide that the uplink (UL) channel and the downlink (DL) channel will have identical responses. As shown in FIG. 1, the DL channel response (DLh$_{m,k}$) from a base station antenna (m) 104 to a UE antenna (k) 108 will match the return UL channel response (ULh$_{k,m}$) from the same UE antenna (k) 108 to the same base station antenna (m) 104. Over time (T), therefore, the overall DL channel response (H$_{DL}$) will also match the overall UL channel response (H$_{UL}$).

Figure 2:
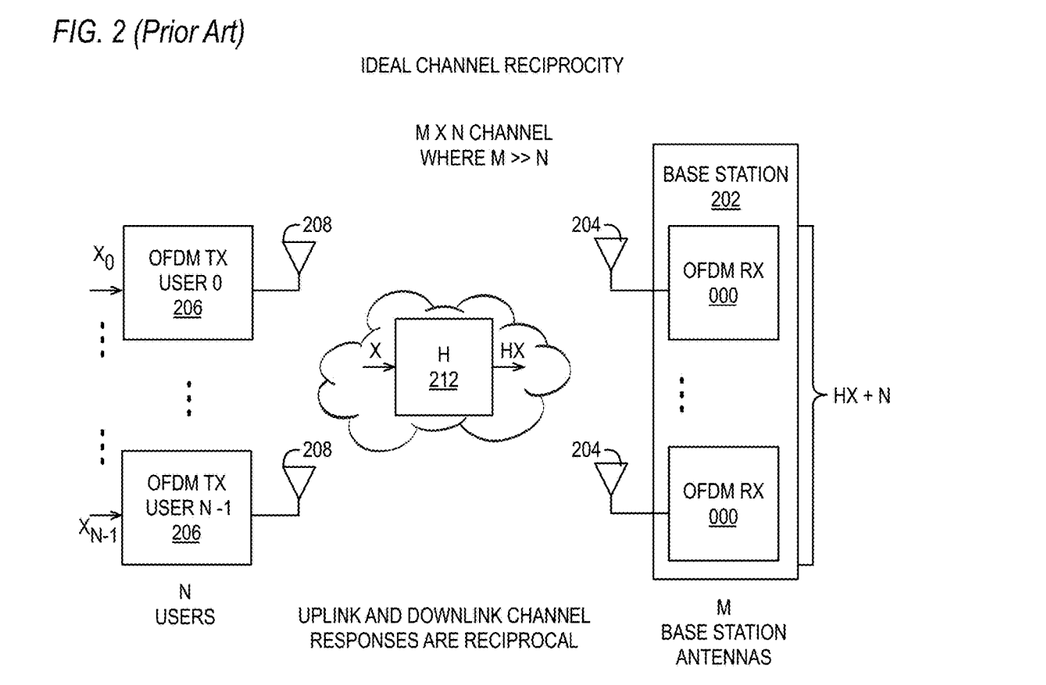
FIG. 2 (Prior Art) is a diagram for ideal channel reciprocity where OFDM (orthogonal frequency division multiplex) communications are being used between a base station with M antennas and N users of user equipment (UE) devices each having an antenna.

FIG. 2 (Prior Art) is a diagram for ideal channel reciprocity where OFDM (orthogonal frequency division multiplex) communications are being used between a base station 202 with M antennas 204 and N users of user equipment (UE) devices 206 each having an antenna 208. The wireless RF (radio frequency) propagation channel 212 is considered to be reciprocal in the uplink (UL) and downlink (DL) communications as shown in FIG. 2. It is noted that this channel reciprocity is intended to be exploited in a number of ways to simplify system design in New Radio (NR) Access Technology standard being developed by 3GPP (3$^{rd}$ Generation Partnership Project) for 5G (fifth generation) mobile communications. Example potential uses of channel reciprocity for the NR standard include: obtaining DL CSI (channel state information) from UL Sounding Pilots, obtaining UL CSI from DL Pilots for initial access/random access, and selecting beam direction in UL/DL based on received beam direction in DL/UL, respectively. It is noted that for FIG. 2, it is assumed that the number (M) of base station antennas 204 is much greater than the number (N) of user antennas 208 (M»N). For example, the number (M) of base station antennas 204 can be ten times or more greater than the number (N) of user antennas 208 (M≥10*N).

The legacy LTE (Long-Term Evolution) standard (since Release 8) has a TDD (time division duplex) mode where reciprocity based operation has been supported. In this TDD mode, a periodic/aperiodic SRS (Sounding Reference Signal) is transmitted by the UE to the base station. The supported time duration between successive SRS reports or transmissions can range from 5 milliseconds (ms) to 40 ms. Based on the CSI-RS (channel state information—reference signals) obtained from the UL SRS reports sent by UEs to the base station, it has been possible to infer the DL-CSI (downlink—channel state information) using the principle of reciprocity.

Figure 3:
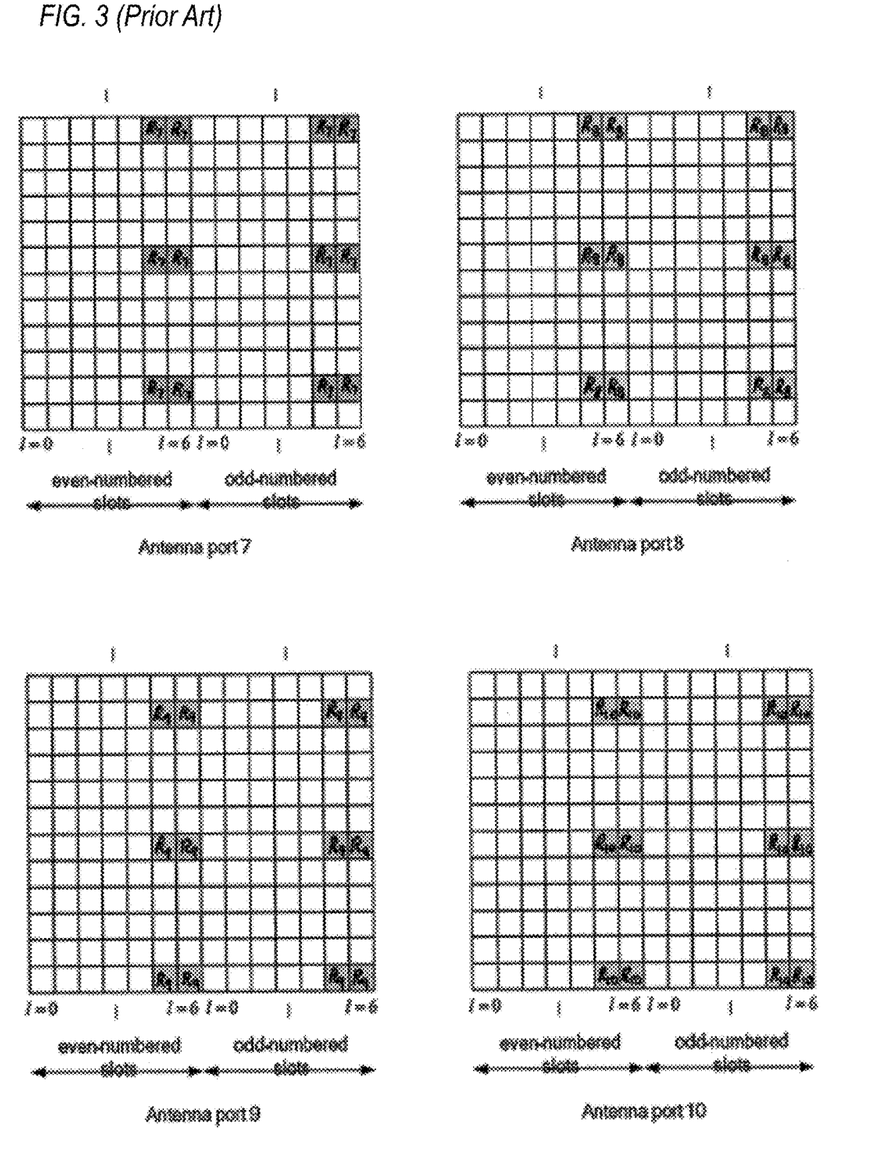
FIG. 3 (Prior art) is an example embodiment of mapping for UE-specific downlink (DL) reference signals transmitted by antenna ports 7-10 of an example multi-antenna base station.

FIG. 3 (Prior art) is an example embodiment of mapping for UE-specific downlink (DL) reference signals transmitted by antenna ports 7-10 of an example multi-antenna base station. In particular, this example embodiment provides a downlink (DL) mapping for resource elements (RE) including REs for DMRS (demodulation—reference signal) transmissions. The downlink DMRS pilots (shown as R7, R8, R9, R10 in this example) are embedded within the data transmission to each UE, and are precoded the same way that the data to the UE is precoded. For the UE to be able to estimate the downlink channel, the DMRS on each spatial stream (shown for antenna ports 7-10 in this example) are mutually orthogonal. This orthogonality is enforced in the time, frequency and code domain. It is noted that the embodiment of FIG. 3 is directed to the LTE legacy scheme, and the downlink pilot overhead is substantial.

Figure 4:
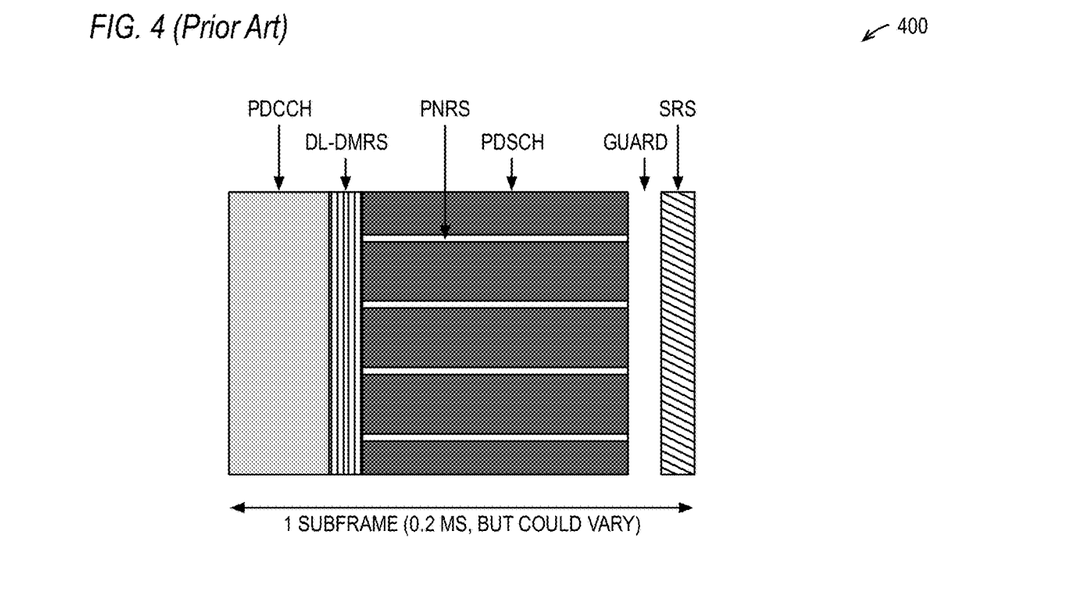
FIG. 4 (Prior Art) is an example embodiment for an OFDM (orthogonal frequency division multiplex) resource grid showing DL-DMRS (downlink DMRS) and DL-PNRS (downlink—phase noise reference signal) transmissions for an example downlink (DL) subframe.

FIG. 4 (Prior Art) is an example embodiment 400 for an OFDM (orthogonal frequency division multiplex) resource grid showing DL-DMRS (downlink DMRS) and DL-PNRS (downlink—phase noise reference signal) transmissions within an example downlink (DL) subframe. The DL-DMRS symbol is output after multiple PDCCH (physical downlink control channel) symbols. Multiple PDSCH (physical downlink shared channel) symbols follow where downlink data can be communicated to UEs. In addition, DL-PNRS (downlink phase noise reference signal) signals can also be transmitted along with these PDSCH symbols. A guard symbol and an SRS (Sounding Reference Signal) symbol can then follow within the subframe. For the embodiment 400, it is assumed that the PDCCH includes three (3) symbols, the DL-DMRS includes one (1) symbol, the PDSCH includes eight (8) symbols, the guard region is one (1) symbol, and the SRS is one (1) symbol. As such, the downlink overhead includes four of the twelve (4/12) OFDM symbols within the subframe. It is also noted that the subframe is assumed to be 0.2 ms in length for the embodiment depicted; however, this length can be varied and different subframe lengths can be used for transmitted subframes.

There are a number of shortcomings of this legacy TDD reciprocity scheme. For example, the fastest supported interval between SRS reports is not sufficient to obtain sufficient information of the short-term statistics of the channel. As such, the DL channel estimate is stale for many practical deployment scenarios, such as high mobility UEs, high Doppler shift transmissions, and other deployment scenarios. As a result, the beamforming supported in the downlink is selected out of a limited DL codebook, and the entry in the codebook is either signaled to the UE or inferred from the DMRS by the UE. The MIMO receive processing burden is shared between the base station and the UE. The base station selects the precoder based on UL SRS or the Codebook Index feedback by the UE and precodes the downlink PDSCH (physical downlink shared channel) data. The UE identifies the precoding either through a DCI (downlink control information) control message addressed to it, or the DMRS transmissions are utilized to perform the downlink channel estimation for each spatial stream at the UE. Further, the density of the SRS resources that are supported in legacy LTE access schemes are not sufficient for dense UE deployments. With FD-MIMO (full division MIMO) within the LTE Release 13 definition, the SRS density has been increased to sixteen (16) but there is scope for further increase to support massive MIMO solutions.

SUMMARY

In some embodiments, a method for reducing complexity of downlink signal demodulation in a multiuser (MU) multiple-input-multiple-output (MIMO) wireless communication system includes a base station acquiring uplink (UL) channel state information (CSI) of a MIMO channel between the base station and a user equipment (UE), deriving downlink (DL) CSI from the UL CSI, and transmitting orthogonal frequency-division multiplexing (OFDM) radio subframes using MIMO pre-equalization based on the DL CSI. The UE performs downlink reciprocity correction of the OFDM subframes received from the base station using a single complex phasor estimate and performs downlink data demodulation of the downlink reciprocity corrected OFDM subframes without performing additional MIMO equalization.

In some embodiments, a base station for use in a multiuser (MU) multiple-input-multiple-output (MIMO) wireless communication system to reduce complexity of downlink signal demodulation by user equipment (UE) of the system includes a plurality of antennas and receive circuitry, coupled to the plurality of antennas, that receives from the UE an uplink (UL) reciprocity reference signal (RRS). The base station also includes processing circuitry that acquires uplink (UL) channel state information (CSI) of a MIMO channel between the base station and the UE using the UL-RRS received from the UE, derives downlink (DL) CSI from the UL CSI and performs MIMO pre-equalization based on the DL CSI. The base station also includes transmit circuitry, coupled to the plurality of antennas, that transmits MIMO pre-equalized orthogonal frequency-division multiplexing (OFDM) radio subframes and sends DL-RRS to enable the UE to derive a single complex phasor estimate using the DL RRS for use in performing downlink reciprocity correction of the MIMO pre-equalized OFDM subframes received from the base station and enables the UE to perform downlink data demodulation of the downlink reciprocity corrected OFDM subframes without performing additional MIMO equalization.

In some embodiments, a user equipment (UE) for use in a multiuser (MU) multiple-input-multiple-output (MIMO) wireless communication system with reduced complexity of downlink signal demodulation of signals received from a base station by the UE includes transmit circuitry that transmits an uplink (UL) reciprocity reference signal (RRS) to enable the base station to acquire uplink UL channel state information (CSI) of a MIMO channel between the base station and the UE using the UL-RRS and to derive downlink (DL) CSI from the UL CSI. The UE also includes receive circuitry that receives from the base station orthogonal frequency-division multiplexing (OFDM) radio subframes transmitted by the base station using MIMO pre-equalization based on the DL CSI. The receive circuitry also performs downlink reciprocity correction of the OFDM subframes received from the base station using a single complex phasor estimate and performs downlink data demodulation of the downlink reciprocity corrected OFDM subframes without performing MIMO equalization additional to the MIMO pre-equalization performed by the base station.

DESCRIPTION OF THE DRAWINGS

It is noted that the appended drawings illustrate only exemplary embodiments and are, therefore, not to be considered limiting of the scope of the present inventions, for the inventions may admit to other equally effective embodiments.

DETAILED DESCRIPTION

Terms

The term user equipment (UE) is intended to be interpreted according to its well-understood meaning, which includes any of various types of computer system devices which are mobile or portable and which perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™) laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

The term base station is intended to be interpreted according to its well-understood meaning, which includes a wireless communication station installed at a fixed location and used to communicate as part of a wireless telephone system or radio system. A base station in the present disclosure has multiple antennas, and the antennas may be closely co-located (e.g., on a single panel) or not closely co-located (e.g., on multiple panels, multiple buildings). For example, a base station may be an eNB (eNodeB) or gNB (gNodeB).

The term multiple-input-multiple-output (MIMO) channel is intended to be interpreted according to its well-understood meaning, which includes a MIMO channel is a channel matrix in which each entry of the matrix is a channel between one antenna of the BS and one antenna of the UE.

The term channel state information (CSI) is intended to be interpreted according to its well-understood meaning, which includes CSI of a MIMO channel comprises the time and frequency response of the MIMO channel.

MIMO pre-equalization is precoding within a multiuser (MU) MIMO system at the base station that enables each spatial stream at each UE to be seen as an effectively flat channel in frequency.

The term precoding is intended to be interpreted according to its well-understood meaning, which includes precoding is multiplication of the input data vector with a precoding matrix.

Downlink reciprocity correction performed by a UE attempts to cancel out the effect of a remaining complex phasor component after channel reciprocity compensation has been performed at the base station.

The term channel reciprocity compensation is intended to be interpreted according to its well-understood meaning, which includes channel reciprocity compensation attempts to cancel out the effect of non-reciprocal aspects of the transmit and receive path circuitry to achieve reciprocity of the uplink channel to the downlink channel.

The term downlink data demodulation is intended to be interpreted according to its well-understood meaning, which includes downlink data demodulation is the process of recovering the information content from the modulated signal received by the UE.

A downlink (DL) reciprocity reference signal (RRS) is a pilot symbol that is used by a UE to estimate a constant phasor difference between a downlink data transmission at a reference transmit base station antenna and a UE receive antenna caused by the intervening wireless channel.

An uplink (UL) reciprocity reference signal (RRS) is a pilot symbol that is used by a base station to acquire UL channel state information.

The term subframe is intended to be interpreted according to its well-understood meaning, which includes a predetermined time duration that is a unit of a radio frame. The predetermined time duration is defined by a standards organization, e.g., 3GPP. For example, in the LTE standard the predetermined time duration for a subframe is 1 millisecond. For another example, the NR standard defines multiple predetermined time durations for a subframe, and the network operator can dynamically select which one of the multiple time durations will be used.

Downlink (DL) signal demodulation techniques using reciprocity reference signals (RRSs) are disclosed that provide more efficient and reduced-complexity techniques for DL signal demodulation. For the disclosed embodiments, downlink signal demodulation is reduced in complexity, for example, by removing or reducing requirements for a DL-DMRS (downlink—demodulation reference signal) transmission. As described herein, the disclosed embodiments in part provide pre-equalization within a MIMO (massive input massive output) system based upon: (1) obtaining short term and un-quantized UL channel state information using UL pilots, and (2) exploiting the reciprocal nature of the wireless channel, with support of reciprocity calibrated base stations. Other variations can also be implemented while still taking advantage of the reduced-complexity DL signal demodulation techniques described herein.

Further, for additional embodiments, methods can also be used to resolve the phasor uncertainty in the downlink. In one further embodiment, the phasor uncertainty is resolved using the downlink (DL) reciprocity reference signal (RRS) in one or more of the following circumstances.

(1) Where this signal is of very low density in time and frequency compared to existing NR and LTE reference signaling. In the ideal case, this density can be as low as a single RE per subframe per DL scheduled UE. In one embodiment, the density is less than about one per four hundred Megahertz of bandwidth.

(2) Where this signal enables the UE to estimate the constant phasor difference between the DL data transmission at the reference transmit antenna, the wireless channel, and the UE receive antenna.

(3) Where this signal could be comprised of one or more other reference signals used for other purposes. For example, in 3GPP NR, this signal could be the low-density phase noise reference signal (PN-RS) which alleviates the need for downlink demodulation reference signal (DM-RS).

In one further embodiment, the phasor uncertainty is resolved through blind detection by a detector using data channel signal statistics in one or more of the following circumstances.

(1) The blind detector uses power law for data channel signals derived from an M-QAM signal set.

(2) The blind detector can be used to partially compensate for the channel impairments aided by the use of the downlink reciprocity reference signal (DL-RRS).

Example embodiments are further described below with respect to FIGS. 5, 6, 7A-B, 8A-C, and 9 that provide reduced-complexity downlink (DL) signal demodulation. It is noted that the reduced-complexity DL signal demodulation techniques described herein can be used for MIMO cellular telecommunication systems such as those described in U.S. Published Patent Application 2015/0326286, entitled "MASSIVE MIMO ARCHITECTURE," U.S. Published Patent Application 2015/0326383, entitled "SYNCHRONIZATION OF LARGE ANTENNA COUNT SYSTEMS," and U.S. Published Patent Application 2015/0326291, entitled "SIGNALING AND FRAME STRUCTURE FOR MASSIVE MIMO CELLULAR TELECOMMUNICATION SYSTEMS," each of which is hereby incorporated by reference in its entirety. It is further noted that different and/or additional features can also be implemented and related systems and methods can be utilized as well.

Figure 5:
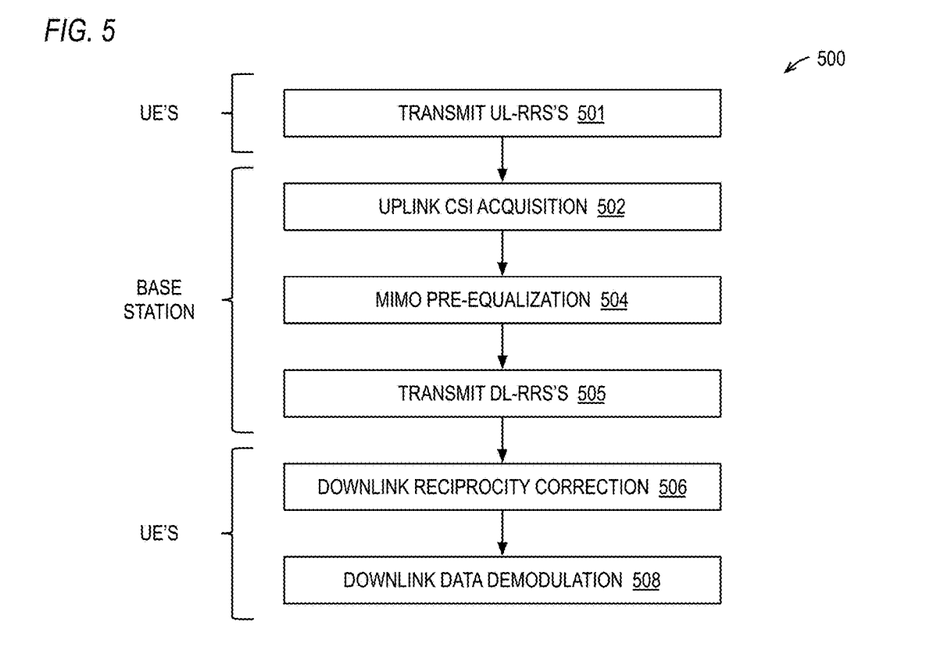
FIG. 5 is a process diagram provided for an example embodiment that provides reduced-complexity downlink (DL) signal demodulation.

Looking now to FIG. 5, a process diagram is provided for an example embodiment 500 that provides reduced-complexity downlink (DL) signal demodulation. As described herein, the process steps provide for reduced-complexity for signal transmissions required for the DL signal demodulation processing by the UE. Variations could also be implemented.

In block 501, uplink (UL) reciprocity reference signals (RRSs) are transmitted by the UEs to a TRP (Transmission Reception Point) such as the base station (e.g., eNodeB for LTE networks). As described herein the UL reciprocity reference signals (RRSs) can be implemented using: (1) a new signal, (2) a reused or modified legacy signal, and/or (3) a combination thereof.

In block 502, uplink CSI (channel state information) is acquired by the base station from the uplink (UL) reciprocity reference signals (RRSs) transmitted by the UEs. With the UL reciprocity reference signals (RRSs), the TRP (Transmission Reception Point) such as the base station can estimate the un-quantized and complete uplink CSI. This CSI will also be acquired within each channel coherence time, and the CSI can be used to provide the short-term statistics of the channel. In NR embodiments, these UL-RRSs can be: (1) new reference signals, (2) reused or modified legacy signals such as uplink NR SRS signals, and/or (3) a combination thereof. The UL CSI is acquired at least once per channel coherence interval. For further embodiments, at least one UL-RRS transmission is made per half legacy subframe, which can be a variable subframe duration in NR embodiments (e.g., 1 ms, 10 ms, and/or other durations). It is also noted that every UE in a connected state transmits an UL-RRS every subframe.

In block 504, the base station preforms MIMO pre-equalization. MIMO pre-equalization refers to precoding within a multiuser (MU) massive MIMO system performed at the TRP that enables each spatial stream at each UE to be seen as an effectively flat channel in frequency. This means that the overhead of channel estimation in the DL is significantly reduced or, preferably, that the UE does not need to perform channel estimation in the DL. Intuitively, this pre-equalization can be thought of as implementing the MIMO decode-side filtering at the transmitter at the base station rather than the receiver at the UE. This pre-equalization also relies upon obtaining high resolution and short-term statistics of the downlink (DL) channel at the TRP within block 502 where the DL CSI is acquired.

In block 505, downlink (DL) reciprocity reference signals (RRSs) are transmitted to the UEs by the TRP (Transmission Reception Point) such as the base station (e.g., eNodeB for LTE networks). As described herein the DL reciprocity reference signals (RRSs) can be implemented using: (1) a new signal, (2) a reused or modified legacy signal, and/or (3) a combination thereof.

In block 506, the UE performs downlink reciprocity correction. There is a phasor ambiguity between the DL CSI at the transmitter and the actual downlink channel as seen by the UE receiver after the signal has passed through its front-end processing. This phasor can be estimated and compensated by a DL-RRS that is transmitted by the base station or by a blind method as described herein. It is also noted that this phasor drifts very slowly over time, at the rate controlled by the relative drifts in the transfer function of the transmit and receive chains at the UE and the base station. For some embodiments, at least one DL-RRS resource can be reserved for each UE that has been allocated a DL grant in each DL part of a given subframe. Further, as indicated above, the DL-RRS signal can be: (1) a new reference signal, (2) a reused or modified legacy signal, and/or (3) a combination thereof. For example, it is possible to reuse an existing legacy signal to perform the same function in an overloaded manner. As a further example for NR embodiments, one or more of the following signals can be used: the phase noise reference signal (PNRS), a lighter/less dense version of UE specific demodulation reference signal (DMRS), or other reused and/or modified NR signals may be utilized including combinations of two or more of these signals.

In block 508, the UE performs downlink (DL) data demodulation. The DL data demodulation at each UE receive chain is implemented in a simplified manner. As there is no necessity for DL channel estimation due to the pre-equalization at the base station, the phasor estimate is sufficient for a simple matched filter detector. It is noted that a DL demodulation reference signal, such as a DMRS in LTE, is not required in this solution. It is also noted that for further performance gain, the UE chain can also be implemented to perform limited (less frequent in time and frequency) DL channel estimation if necessary, which will still provide a significant decrease in complexity and resource usage over legacy DMRS techniques. With respect to FIGS. 7A-B below, it is seen that the received channel is relatively flat across frequency with the transmit side pre-equalization processing.

It is noted that the reduced-complexity downlink (DL) signal demodulation provided by embodiment 500 relies in part upon the following: (1) that the MIMO system is a TDD (time division duplex) system, (2) that reciprocity calibration (also referred to as reciprocity compensation), is performed in the base station, and (3) that reciprocity calibrated UEs are not required. The TDD nature of the MIMO system means that the UL and DL channel band is the same. As a consequence, using the principle of reciprocity of electromagnetic waves, the channel state information can be considered to be the same in the UL and DL transmissions between any two given antennas. Reciprocity calibration is performed at the base station, at occasional time intervals, to ensure that the phasor difference between any given transmit receive chain, and pairwise between any two transmit chains, is constant and known. This reciprocity calibration/compensation can be performed in a cabled or over the air manner, with or without the UE involved in the calibration step. Example embodiments for reciprocity calibration/compensation are described within U.S. patent application Ser. No. 15/674,263, filed Aug. 10, 2017, entitled "INTRA-NODE CHANNEL RECIPROCITY COMPENSATION FOR RADIO ACCESS IN MIMO WIRELESS COMMUNICATION SYSTEMS" and U.S. patent application Ser. No. 15/674,282, filed Aug. 10, 2017, entitled "UE-AIDED CHANNEL RECIPROCITY COMPENSATION FOR RADIO ACCESS IN MIMO WIRELESS COMMUNICATION SYSTEMS," each of which claims the benefit of U.S. Provisional Patent Application 62/373,710, filed Aug. 11, 2016, entitled "CHANNEL RECIPROCITY COMPENSATION FOR RADIO ACCESS IN MIIMO WIRELESS COMMUNICATION SYSTEMS," all of which are hereby incorporated by reference in their entirety. Unlike the base station, the UEs do not need to be calibrated for reciprocity. This lack of need for UE reciprocity calibration is enabled by the DL-RRS transmission from the base station. UEs typically have low quality RF front ends as compared to the base station, and their RF transfer function will change at a much faster rate than at the base station. Hence, it is highly advantageous to be able to operate with non-calibrated UEs and without requiring UE reciprocity calibration.

Figure 6:
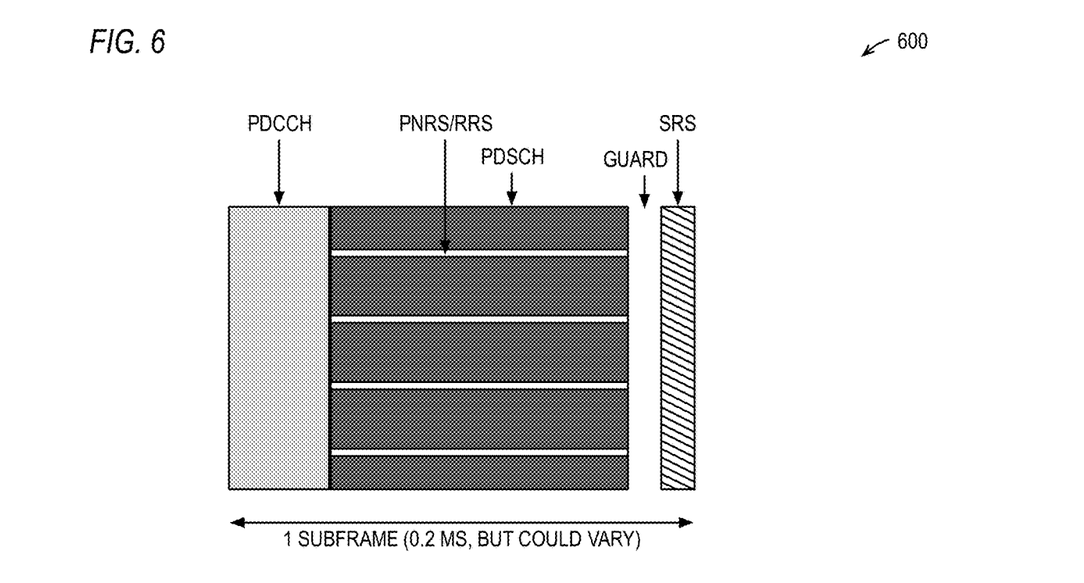
FIG. 6 is an example embodiment for an OFDM (orthogonal frequency division multiplex) resource grid for an example downlink (DL) subframe that removes the DL-DMRS (downlink DMRS) transmission used with respect to FIG. 4 (Prior Art).

FIG. 6 is an example embodiment 600 for an OFDM (orthogonal frequency division multiplex) resource grid for an example downlink (DL) subframe that removes the DL-DMRS (downlink DMRS) transmission used with respect to FIG. 4 (Prior Art). It is noted that the subframe is again assumed to be 0.2 ms in length for the embodiment depicted; however, this length can be varied and different subframe lengths can be used for transmitted subframes. For this embodiment, the PDCCH (physical downlink control channel) symbol is followed by multiple PDSCH (physical downlink shared channel) symbols in which downlink data can be communicated to UEs. As the symbol including the DL-DMRS is no longer required, an additional PDCCH symbol can be included, although this additional symbol space can also be used for other transmissions, if desired for particular solutions. In addition, DL-PNRS (downlink phase noise reference signal) signals can still be transmitted along with these PDSCH symbols. As described in more detail herein, the DL-PNRS signal can also be used as a DL-RRS signal for demodulation and further phase uncertainty resolution at the user device.

The disclosed embodiments, therefore, eliminate the need for DL-DMRS. As shown in FIG. 6, the requirement for DL-DMRS after the PDCCH transmission has been removed. For the embodiment 600, it is assumed that the PDCCH includes three (3) symbols, the PDSCH includes nine (9) symbols, the guard region is one (1) symbol, and the SRS is one (1) symbol. As such, the downlink overhead now includes three of the twelve (3/12) downlink OFDM symbols within the subframe. This example embodiment, therefore, reduces downlink overhead from 4/12 OFDM symbols (i.e., 33% overhead) for the embodiment of FIG. 4 (Prior Art) to 3/12 OFDM symbols (i.e., 25% overhead) for the embodiment FIG. 6. This overhead reduction thereby increases downlink throughput by 12.5% as the symbols used for DL-DMRS can instead be used for PDSCH and/or other data communications. Thus, as described herein by reducing the complexity of processing and signal transmissions required for downlink (DL) signal demodulation, overall system performance is improved.

In contrast for LTE-A systems, the DL-DMRS signals are also referred to as UE specific RS signal and occupy up to 24 REs out of the 132 RE that the PDSCH can occupy per RB (resource block), i.e, up to 18% overhead. Further for NR systems, DL-DMRS signals are expected to occupy one symbol immediately after (possibly 1-4 symbol of) the physical downlink control channel (PDCCH) as shown in FIG. 4 (Prior Art).

Figure 7A:
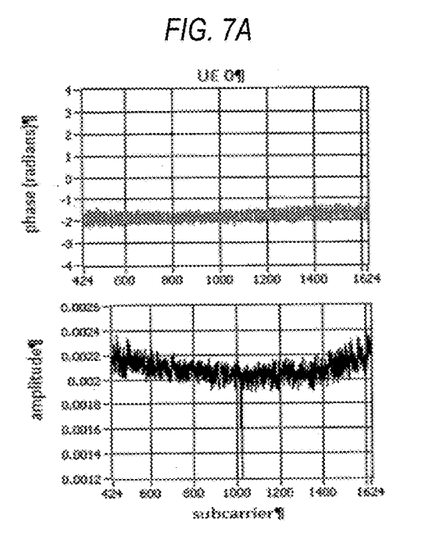
FIGS. 7A-B are example embodiments for magnitude and phase measured for received downlink signals for two, simultaneous UEs (UE0, UE1) where the reduced-complexity downlink signal demodulation techniques described herein are utilized in a MIMO system.
Figure 7B:
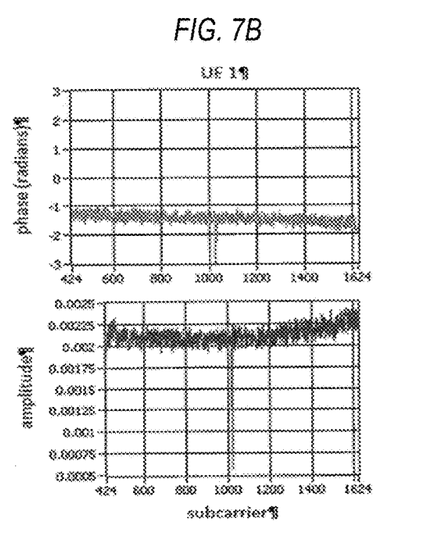

FIGS. 7A-B are example embodiments for magnitude and phase measured for received downlink signals for two, simultaneous UEs (UE0, UE1) where the reduced-complexity downlink signal demodulation techniques described herein are utilized in a MIMO system. It is noted that the random, constant scalar is approximately $0.0021 e^{-j1.8}$ for UE0 and is approximately $0.0021 e^{-j1.5}$ for UE1. It is seen, therefore, that the received channel is relatively flat across frequency with the transmit side pre-equalization processing.

Figure 8A:
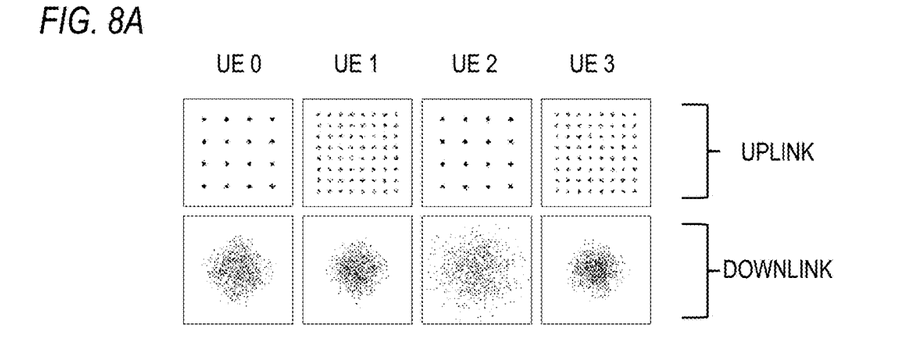
FIGS. 8A-C are example simulations of massive MIMO uplink (upper plots) and downlink (lower plots) for 16 antennas and 4 UEs (e.g., user terminals).
Figure 8B:
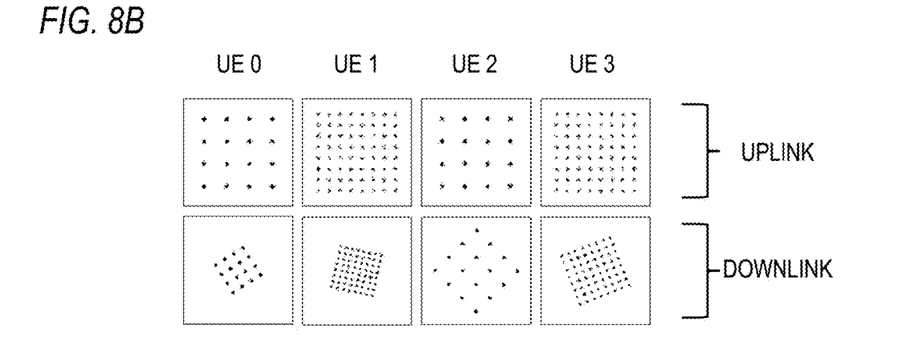
Figure 8C:
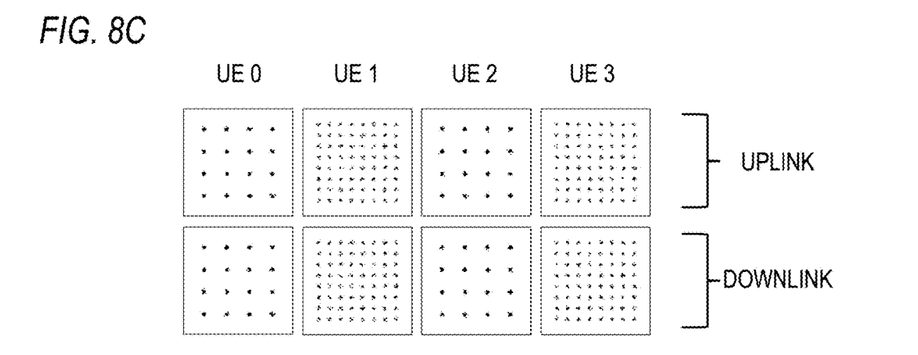

FIGS. 8A-C are example simulations of massive MIMO uplink (upper plots) and downlink (lower plots) for 16 antennas and 4 UEs (e.g., user terminals). FIG. 8A is a simulation of uplink/downlink signals between the UEs (UE0, UE1, UE2, UE3) and the base station without reciprocity calibration (pre-equalization) as described herein performed by the base stations. FIG. 8B is a simulation of uplink/downlink signals between the UEs and the base station with reciprocity calibration (pre-equalization) as described herein performed by the base station. FIG. 8C is a simulation of uplink/downlink signals between the UEs and the base station with reciprocity calibration (pre-equalization) as described herein performed by the base station as well as resolution of phasor uncertainty with the UEs, for example using a DL-RRS.

Using reciprocity calibration allows downlink precoding within the base station to pre-equalize the channel and cancel inter-user interference that distorts the downlink constellation as shown in the downlink plots for FIG. 8A. Ideally, each user receives an interference-free transmission with a residual scaling by a user-independent, complex scalar as shown in the downlink plots for FIG. 8B. By applying a reduced-complexity, single downlink reciprocity resource signal (DL-RRS) within a single resource element (RE), the complex scalar can be estimated and corrected for as shown in the downlink plots for FIG. 8C. For the example embodiments depicted in FIGS. 8A-C, it is noted that UE0 and UE2 are configured to receive a 16-QAM (quadrature amplitude modulated) signal and that UE1 and UE3 are configured to receive a 64-QAM signal. These modulation schemes are provided as one example, and it is further noted that the UEs can be configured to receive signals using one or more different modulation schemes.

As described herein, one or more techniques can be applied to estimate phase uncertainty within the UEs. For some embodiments, a blind detection scheme can be applied. For example, the random complex scalar at each UE can be estimated blindly (e.g., without reference symbols) using known signal statistics. In a massive MIMO system after precoding, the received vector data symbols for each k user can be modeled as:

$$y_{k,i} = \alpha_k s_{k,i} + n_{k,i}$$

where $s_{k,i}$ is the M-QAM (multiple-quadrature amplitude modulated) symbol intended for user k, $\alpha_k = \beta e^{j\theta}$ is the random complex scalar of magnitude $\beta$ and phase $\theta$ (which is the same for the entire OFDM symbol vector (all i)), and $n_{k,i}$ is zero-mean additive noise. Both phase $\theta$ and magnitude $\beta$ of $\alpha_k$ can be estimated using blind detection schemes.

With respect to estimating phase $\theta$ for this blind estimation, the following technique can be applied as one example embodiment. For any M-QAM signal, ideally a diagonal constellation point resides at the angle of $$M\frac{\pi}{2} + \frac{\pi}{4}.$$

For common M-QAM sets M=0, 1, 2, 3 with the presence of phase rotation θ, the actual angular position with the phase rotation is:

$$M\frac{\pi}{2} + \frac{\pi}{4} + \theta$$

To estimate θ, take the $4^{th}$ power of the received signal $y_i$, and the angle becomes:

$$2\pi M + \pi + 4\theta + 4\varphi_{k,i}$$

In the resulting equation, 2πM equals zero. What remains is a vector with angle $\pi+4\theta+4\varphi_{k,i}$ that can be used to directly estimate θ by averaging multiple points. Here, $4\varphi_{k,i}$ is a zero-mean phase noise component that tends to zero upon averaging.

With respect to estimating magnitude β for this blind estimation, the following technique can be applied as one example embodiment to estimate the amplitude ($\beta_k$) of $\alpha_k$. The vector norm of $y_{k,i}$ for a given k within a resource (e.g., one or more OFDM symbols) can be averaged as follows:

$$\hat{\beta} = \frac{1}{N^2}\|y_i\|_2 = \frac{1}{N^2}\sqrt{\sum_{i=0}^{N-1}|y_{k,i}|^2}$$

Using the above phase and magnitude estimation methods, $\alpha_k$ can be blindly estimated on the base station (e.g., eNodeB) or UE side of the link. This estimation can then be used to correct for phasor uncertainty.

Figure 9:
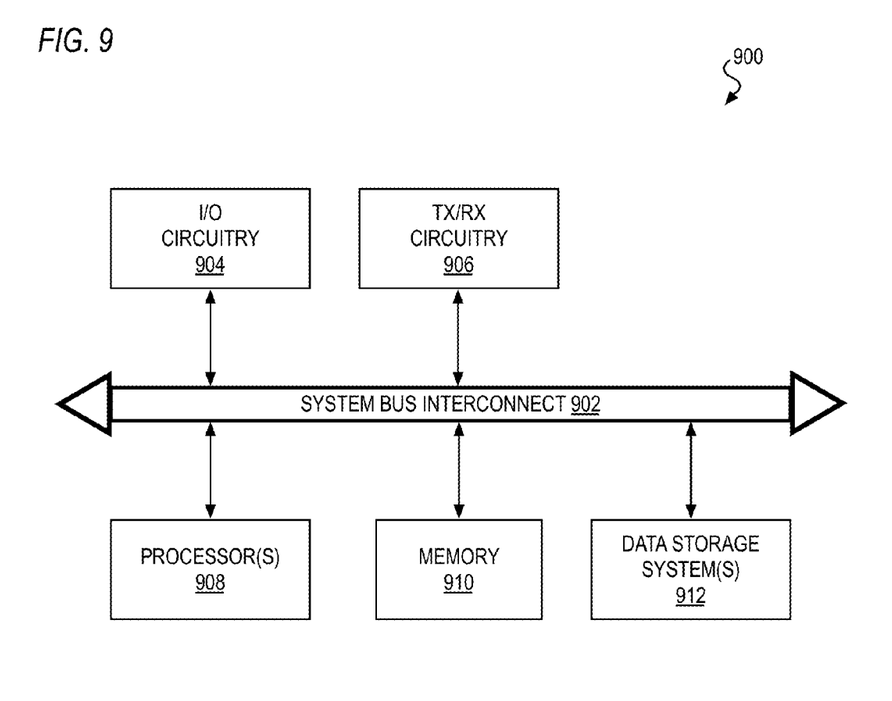
FIG. 9 is a diagram of an example embodiment for electronic components that can be used to implement a base station and/or user equipment (UE).

FIG. 9 is a diagram of an example embodiment 900 for electronic components that can be used to implement a base station and/or user equipment (UE). For the example embodiment 900 shown in FIG. 9, one or more processors 908 communicate with other components through system bus interconnect 902. For example, the one or more processors 908 communicate with input/output (I/O) circuitry 904 and transmit/receive (TX/RX) circuitry 906 through the system bus interconnect 902. Additional circuitry can also be included such as power supply circuitry and/or other desired circuitry. The TX/RX circuitry 906 provides one or more cellular radios and are preferably coupled to a plurality of antennas through which the TX/RX circuitry transmits and receives RF (radio frequency) signals (e.g., from a few kHz to 10 GHz and above). The I/O circuitry 904 provides one or more interfaces for users, such as graphical user interfaces, and/or connections to peripheral devices (e.g., displays, keyboards, mice, point device, and/or other I/O peripheral devices). The memory 910 is also coupled to the system bus interconnect 902 and can be used by the one or more processors 908 to load and/or store instructions, data, and/or other information during operation. One or more data storage device(s) 912 are also connected to the system bus interconnect 902 and can store software or program instructions and/or other desired data or information for the operation of the processing system. For example, computer-readable instructions stored in the data storage devices 912 can be loaded within the memory 910 and then executed by the processor(s) 908 to carry out the functions described herein.

It is noted that different and/or additional components from those depicted in FIG. 9 could also be used to implement one or more radio systems for the embodiments described herein while still taking advantage of the reduced-complexity DL signal demodulation techniques described herein. It is further noted that the system bus interconnect 902 can be implemented as multiple interconnection buses with or without additional intervening circuitry such as routing or switching circuitry. Further, the processor(s) 908 can be implemented using one or more programmable integrated circuits including controllers, microcontrollers, microprocessors, hardware accelerators, configurable logic devices (e.g., field programmable gate arrays), and/or other programmable integrated circuits that are programmed to carry out the function described herein. Further, the one or more processor(s) 908 can execute instructions stored in a non-transitory tangible computer-readable medium to perform the functions described herein. In addition, data storage device(s) 912 can be implemented as any desired non-transitory tangible medium that stores data, such as data storage devices, FLASH memory, random access memory, read only memory, programmable memory devices, reprogrammable storage devices, hard drives, floppy disks, DVDs, CD-ROMs, and/or any other non-transitory data storage mediums. The memory 910 can be any data storage medium configured to maintain data storage when powered. Other variations could also be implemented.

It is also noted that the functional blocks described herein can be implemented using hardware, software, or a combination of hardware and software, as desired. In addition, one or more processors or processing circuitry running software and/or firmware can also be used, as desired, to implement the disclosed embodiments. It is further understood that one or more of the operations, tasks, functions, or methodologies described herein may be implemented, for example, as software or firmware and/or other program instructions that are embodied in one or more non-transitory tangible computer readable mediums (e.g., memory) and that are executed by one or more controllers, microcontrollers, microprocessors, hardware accelerators, and/or other processors or processing circuitry to perform the operations and functions described herein.

It is further noted that the functional blocks, devices, and/or circuitry described herein can be implemented using hardware, software, or a combination of hardware and software. In addition, one or more processors (e.g., central processing units (CPUs), controllers, microcontrollers, microprocessors, hardware accelerators, programmable integrated circuitry, FPGAs (field programmable gate arrays), ASICs (application specific integrated circuits), and/or other programmable processing circuitry) can be programmed to perform the operations, tasks, functions, or actions described herein for the disclosed embodiments. For example, the one or more electronic circuits can be configured to execute or otherwise be programmed with software, firmware, logic, and/or other program instructions stored in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) to perform the operations, tasks, functions, or actions described herein for the disclosed embodiments.

It is still further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the reduced-complexity DL signal demodulation techniques described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

The invention claimed is:

1. A method for reducing complexity of downlink signal demodulation in a multiuser (MU) multiple-input-multiple-output (MIMO) wireless communication system, the method comprising:
   acquiring, by a base station, uplink (UL) channel state information (CSI) of a MIMO channel between the base station and a user equipment (UE);
   deriving, by the base station, downlink (DL) CSI from the UL CSI;
   transmitting, by the base station, orthogonal frequency-division multiplexing (OFDM) radio subframes using MIMO pre-equalization based on the DL CSI;
   performing, by the UE, downlink reciprocity correction of the OFDM subframes received from the base station using a single complex phasor estimate; and
   performing, by the UE, downlink data demodulation of the downlink reciprocity corrected OFDM subframes without performing additional MIMO equalization;
   wherein the MU MIMO wireless communication system comprises a plurality of UE;
   wherein said using MIMO pre-equalization based on the DL CSI comprises:
      precoding, by the base station, each OFDM subframe transmitted by the base station to cause each spatial stream at each UE of the plurality of UE to be seen as an effectively flat channel in frequency;
   performing, by the base station, channel reciprocity compensation to attempt to cancel out an effect of non-reciprocal aspects of RF transmit and receive circuitry of the base station and the UE to achieve reciprocity of the uplink channel to the downlink channel; and
   wherein the downlink reciprocity correction performed by the UE cancels out the effect of a remaining complex phasor component after the channel reciprocity compensation has been performed by the base station.

2. The method of claim 1, further comprising:
transmitting, by the base station, a DL reciprocity reference signal (RRS); and
deriving, by the UE, the complex phasor estimate using the DL RRS.

3. The method of claim 2,
wherein the DL-RRS comprises a downlink phase noise reference signal (DL-PNRS).

4. The method of claim 2,
wherein the MU MIMO wireless communication system comprises a plurality of UE; and
wherein the base station sends DL-RRS at a density of a single resource element per subframe per downlink scheduled UE of the plurality of UE.

5. The method of claim 2, further comprising:
wherein the base station sends DL-RRS at a density no greater than about one per four Megahertz of bandwidth.

6. The method of claim 1, further comprising:
determining, by the UE, the complex phasor estimate by blind detection.

7. The method of claim 6,
wherein said determining, by the UE, the complex phasor estimate by blind detection comprises using power law for data channel signals derived from an M-QAM (quadrature amplitude modulation) signal set.

8. The method of claim 1, further comprising:
determining, by the UE, the complex phasor estimate by blind detection and aided by use of a DL reciprocity reference signal (RRS) transmitted by the base station.

9. The method of claim 1,
wherein the OFDM subframes are absent a downlink demodulation reference signal (DL-DMRS).

10. The method of claim 1, further comprising:
transmitting, by the UE, an UL reciprocity reference signal (RRS); and
wherein said acquiring the UL CSI is performed by the base station using the UL-RRS received from the UE.

11. A base station for use in a multiuser (MU) multiple-input-multiple-output (MIMO) wireless communication system to reduce complexity of downlink signal demodulation by user equipment (UE) of the system, the base station comprising:
   a plurality of antennas;
   receive circuitry, coupled to the plurality of antennas, that receives from the UE an uplink (UL) reciprocity reference signal (RRS);
   processing circuitry configured to:
      acquire uplink (UL) channel state information (CSI) of a MIMO channel between the base station and the UE using the UL-RRS received from the UE;
      derive downlink (DL) CSI from the UL CSI; and
      perform MIMO pre-equalization based on the DL CSI;
   transmit circuitry, coupled to the plurality of antennas, configured to transmit MIMO pre-equalized orthogonal frequency-division multiplexing (OFDM) radio subframes and to send DL-RRS to enable the UE to derive a single complex phasor estimate using the DL RRS for use in performing downlink reciprocity correction of the MIMO pre-equalized OFDM subframes received from the base station and to enable the UE to perform downlink data demodulation of the downlink reciprocity corrected OFDM subframes without performing additional MIMO equalization;
   wherein to perform MIMO pre-equalization based on the DL CSI, the base station precodes each transmitted OFDM subframe to cause each spatial stream at each UE of a plurality of UE of the wireless communication system to be seen as an effectively flat channel in frequency;
   wherein the processing circuitry is further configured to perform channel reciprocity compensation to attempt to cancel out an effect of non-reciprocal aspects of RF transmit and receive circuitry of the base station and the UE to achieve reciprocity of the uplink channel to the downlink channel; and
   wherein the downlink reciprocity correction performed by the UE cancels out the effect of a remaining complex phasor component after the channel reciprocity compensation has been performed by the base station.

12. The base station of claim 11, further comprising:
   wherein the DL-RRS comprises a downlink phase noise reference signal (DL-PNRS).

13. The base station of claim 11,
   wherein the MU MIMO wireless communication system comprises a plurality of UE; and
   wherein the base station sends the DL-RRS at a density of a single resource element per subframe per downlink scheduled UE of the plurality of UE.

14. The base station of claim 11, further comprising:
   wherein the base station sends DL-RRS at a density no greater than about one per four Megahertz of bandwidth.

15. The base station of claim 11,
   wherein the OFDM subframes are absent a downlink demodulation reference signal (DL-DMRS).

16. A user equipment (UE) for use in a multiuser (MU) multiple-input-multiple-output (MIMO) wireless communication system with reduced complexity of downlink signal demodulation of signals received from a base station by the UE, the UE comprising:
   transmit circuitry that transmits an uplink (UL) reciprocity reference signal (RRS) to enable the base station to acquire uplink UL channel state information (CSI) of a MIMO channel between the base station and the UE using the UL-RRS and to derive downlink (DL) CSI from the UL CSI;
   receive circuitry configured to:
      receive from the base station orthogonal frequency-division multiplexing (OFDM) radio subframes transmitted by the base station using MIMO pre-equalization based on the DL CSI;
      perform downlink reciprocity correction of the OFDM subframes received from the base station using a single complex phasor estimate;
      perform downlink data demodulation of the downlink reciprocity corrected OFDM subframes without performing MIMO equalization additional to the MIMO pre-equalization performed by the base station;
   wherein the received OFDM radio subframes transmitted by the base station using MIMO pre-equalization based on the DL CSI are precoded by the base station to cause each spatial stream at the UE to be seen as an effectively flat channel in frequency;
   wherein the received OFDM radio subframes have had performed on them, by the base station, channel reciprocity compensation to attempt to cancel out an effect of non-reciprocal aspects of RF transmit and receive circuitry of the base station and the UE to achieve reciprocity of the uplink channel to the downlink channel; and
   wherein the downlink reciprocity correction performed by the UE cancels out the effect of a remaining complex phasor component after the channel reciprocity compensation has been performed by the base station.

17. The UE of claim 16, further comprising:
   wherein the receive circuitry is further configured to receive from the base station a DL-RRS; and
   processing circuitry configured to derive the complex phasor estimate using the DL RRS.

18. The UE of claim 16, further comprising:
   processing circuitry configured to determine the complex phasor estimate by blind detection.

19. The UE of claim 16, further comprising:
   processing circuitry configured to determine the complex phasor estimate by blind detection and aided by use of a DL-RRS received from the base station.

20. The UE of claim 16,
   wherein the OFDM subframes are absent a downlink demodulation reference signal (DL-DMRS).

* * * * *